US007497352B2

(12) United States Patent
Segiet et al.

(10) Patent No.: US 7,497,352 B2
(45) Date of Patent: Mar. 3, 2009

(54) METHOD AND APPARATUS FOR PRODUCT AGITATION IN A VENDING MACHINE

(75) Inventors: William Segiet, Bethel, CT (US); Michel Saba, Carmel, NY (US)

(73) Assignee: PepsiCo, Inc., Purchase, NY (US)

( * ) Notice: Subject to any disclaimer, the term of this patent is extended or adjusted under 35 U.S.C. 154(b) by 98 days.

(21) Appl. No.: 11/335,961

(22) Filed: Jan. 20, 2006

(65) Prior Publication Data

US 2007/0170195 A1 Jul. 26, 2007

(51) Int. Cl.
*A47J 37/12* (2006.01)

(52) U.S. Cl. .................................. 221/150 A; 221/220

(58) Field of Classification Search ................. 221/200, 221/150 A

See application file for complete search history.

(56) References Cited

U.S. PATENT DOCUMENTS 2,818,483 A 12/1957 Blume
2,831,419 A * 4/1958 Timm .......................... 99/357
2,851,324 A * 9/1958 Wellekens ................... 312/45
3,968,459 A * 7/1976 Jacobson .................... 333/141
4,020,310 A 4/1977 Souder, Jr. et al.
4,110,587 A 8/1978 Souder, Jr. et al.

(Continued)

FOREIGN PATENT DOCUMENTS

JP 8288055 A 11/1996

(Continued)

OTHER PUBLICATIONS

International Search Report, pp. 1-5.

*Primary Examiner*—Gene Crawford
*Assistant Examiner*—Timothy R Waggoner
(74) *Attorney, Agent, or Firm*—Banner & Witcoff, Ltd.

(57) ABSTRACT

Heating devices and methods which are particularly useful in vending machines for hot products. Products such as beverages contained in individual containers such as cans are rapidly heated to serving temperature by induction heating for delivery to a customer. Various types of products with different heating characteristics are rapidly heated without deleterious effects on the product by varying the power and timing of the inductive heating. The type of product is identified by machine-readable indicia on the container which are automatically scanned prior to heating. The product containers are agitated before, during and/or after heating to mix the contents and distribute heat evenly. The containers are heated in a manner to safely heat the product without overheating or causing damage to the container. A power management protocol turns off non-essential components of the vending machine while the inductive heater is energized to permit the vending machine to operate on a standard 120 VAC, 15 A electrical circuit without overload.

16 Claims, 7 Drawing Sheets

U.S. PATENT DOCUMENTS

| | | | | | |
|---|---|---|---|---|---|
| 4,171,066 | A | * | 10/1979 | Hirose | 221/150 A |
| 4,307,276 | A | | 12/1981 | Kurata et al. | |
| 4,549,051 | A | | 10/1985 | Ness | |
| 4,677,278 | A | | 6/1987 | Knoll | |
| 4,784,292 | A | * | 11/1988 | Johndrow et al. | 221/101 |
| 5,538,749 | A | * | 7/1996 | Shimp | 426/589 |
| 5,570,811 | A | | 11/1996 | Wittern, Jr. et al. | |
| 5,598,947 | A | * | 2/1997 | Smith | 221/150 HC |
| 5,688,423 | A | | 11/1997 | Rudewicz et al. | |
| 5,690,851 | A | | 11/1997 | Yoshioka et al. | |
| 5,821,504 | A | | 10/1998 | Sprenger et al. | |
| 6,112,943 | A | | 9/2000 | Lauer | |
| 6,350,972 | B1 | | 2/2002 | Wright et al. | |
| 6,917,024 | B2 | * | 7/2005 | Lee et al. | 219/752 |
| 2002/0079323 | A1 | | 6/2002 | Lauer | |
| 2003/0146239 | A1 | | 8/2003 | Beauregard | |
| 2004/0184651 | A1 | | 9/2004 | Nordbryhn et al. | |
| 2004/0238557 | A1 | | 12/2004 | Chirnomas | |
| 2004/0256382 | A1 | | 12/2004 | Pilavdzic et al. | |
| 2005/0189370 | A1 | | 9/2005 | Carter et al. | |

FOREIGN PATENT DOCUMENTS

| | | | |
|---|---|---|---|
| JP | 2000231666 | A | 8/2000 |

* cited by examiner

METHOD AND APPARATUS FOR PRODUCT AGITATION IN A VENDING MACHINE

FIELD OF THE INVENTION

The present invention relates to food heating devices and methods. More particularly, the present invention relates to such devices for use in vending machines and systems.

BACKGROUND OF THE INVENTION

A need exists for a method and apparatus for heating a food contained in a food container. It would be advantageous for such a method and apparatus to be suitable for use in a vending machine and to be capable of rapidly heating the contents of the container to minimize consumer waiting time after the consumer places an order. This is particularly the case if the method and/or apparatus is used for heating individual portion containers in a vending machine environment. The consumer, upon placing an order, does not want to wait for an extended period of time for the machine to vend the chosen type of hot food. Such foods, when pre-made, typically are stored at about room temperature or below to preserve the flavor of such foods. Consequently, foods that are normally served hot, such as beverages including various types of coffee and hot chocolate, for example, must be heated prior to dispensing to a customer.

A need also exists for a method and device that is capable of heating to a uniform, elevated temperature various types of foods that have different heating characteristics within a relatively short period of time while avoiding any deleterious effects to the food container or the food that could occur by overheating or an excessive rate of heating, particularly for a vending machine.

In addition, a need exists for a method and apparatus for safely, reliably and quickly heating an individual-sized serving of a product that is contained in a container suitable for use in a vending machine.

In addition, to insure proper and uniform heating, and the quality and taste of such foods, particularly in a vending machine setting, a need exists for a reliable method and apparatus for agitating a selected food.

SUMMARY OF THE INVENTION

In accordance with one aspect of the present invention, a method of dispensing a food is provided. The method, in one embodiment, includes providing a food contained in a container in a vending machine, the food being substantially liquid, that is, of the type that has multiple components and at least one component of the food separates from another food component during storage. The method includes agitating a selected container in the vending machine and thereafter heating the food contained in the container to uniformly disperse the food contained in the container.

In accordance with one embodiment of the invention, the agitating comprises tumbling the selected container. In addition, the method may further comprise agitating the selected container during heating thereof. The agitation during heating may comprise vibrating the container, which can be accomplished by any suitable method to thereby agitate the food in the container. One suitable method of agitation during the heating is vibrating, displacing, shaking or moving the container to thereby agitate the food by a piezoelectric crystal transducer, or by vibrating the container using an ultrasonic generator.

In addition, the method of the present invention may further include agitating the selected container after heating.

The agitating desirably uniformly mixes the food in the selected container. The agitating may comprise tumbling the selected container and such tumbling may occur when the container travels from a storage area to a heating device contained in the vending machine. The tumbling may comprise end-over-end tumbling of the selected container.

In accordance with another aspect of the present invention, the heating comprises induction heating of the selected container.

In accordance with another aspect of the invention, a vending machine apparatus is provided that agitates a food contained in a container. The vending machine includes a housing, a storage area in the housing for containing a plurality of food containers having food contained therein, a heating device in the housing for heating a selected container and a container pathway for delivering a selected container to the heating device, the pathway causing the container to be agitated by physical movement of the container along the pathway. The pathway may be configured to provide a tumbling action to the container, which may be an end-over-end tumbling.

In accordance with still another aspect of the present invention, a vending machine apparatus is provided for agitating the food contained in a container. The vending machine apparatus includes a housing, a storage area in the housing for containing a plurality of containers having food contained therein, a heating device in the housing for heating a selected container and a device for agitating the selected container during heating by the heating device. The device for agitating may comprise a piezoelectric transducer. Alternatively, the agitating device may comprise an ultrasound generator. In addition, the vending machine apparatus may further include a container pathway for delivering the selected container to the heating device and for agitating the food contained in the selected container as a result of transport along the pathway.

In another aspect of the invention, the heating may be controlled by a controller that implements a predetermined heating profile for controlling the inductive heating coil and heating a food. The heating profile is based on at least the type of food that is selected to be heated. Other factors may include the starting and final temperatures, the amount of food, the type and shape of the container and the type and amount of agitation of the food during heating. In one embodiment, the controller is capable of adjusting the amount of heat energy input to the container based on the starting temperature data. The controller may also be capable of adjusting the amount of heat energy input to the container based both on the starting temperature data and the temperature data during heating. The heating profile could be used with heating devices other than inductive heating devices.

DETAILED DESCRIPTION OF THE INVENTION

In accordance with the present invention, new and useful vending machines and systems, devices and systems for vending, components thereof and methods of vending foods are provided. As used herein, "food" means any consumable product including, but not limited to, beverages. Preferably, the food includes a liquid component present in sufficient quantity so that during inductive heating, the liquid component is caused to move by convection currents within the container, and some heat transfer occurs by convection as well as by conduction. This is preferable to obtain sufficiently uniform heating of the food, and to heat the food to the desired temperature in a short enough time, so as to provide customer satisfaction with both the food product and the overall vending experience.

Figure 1:
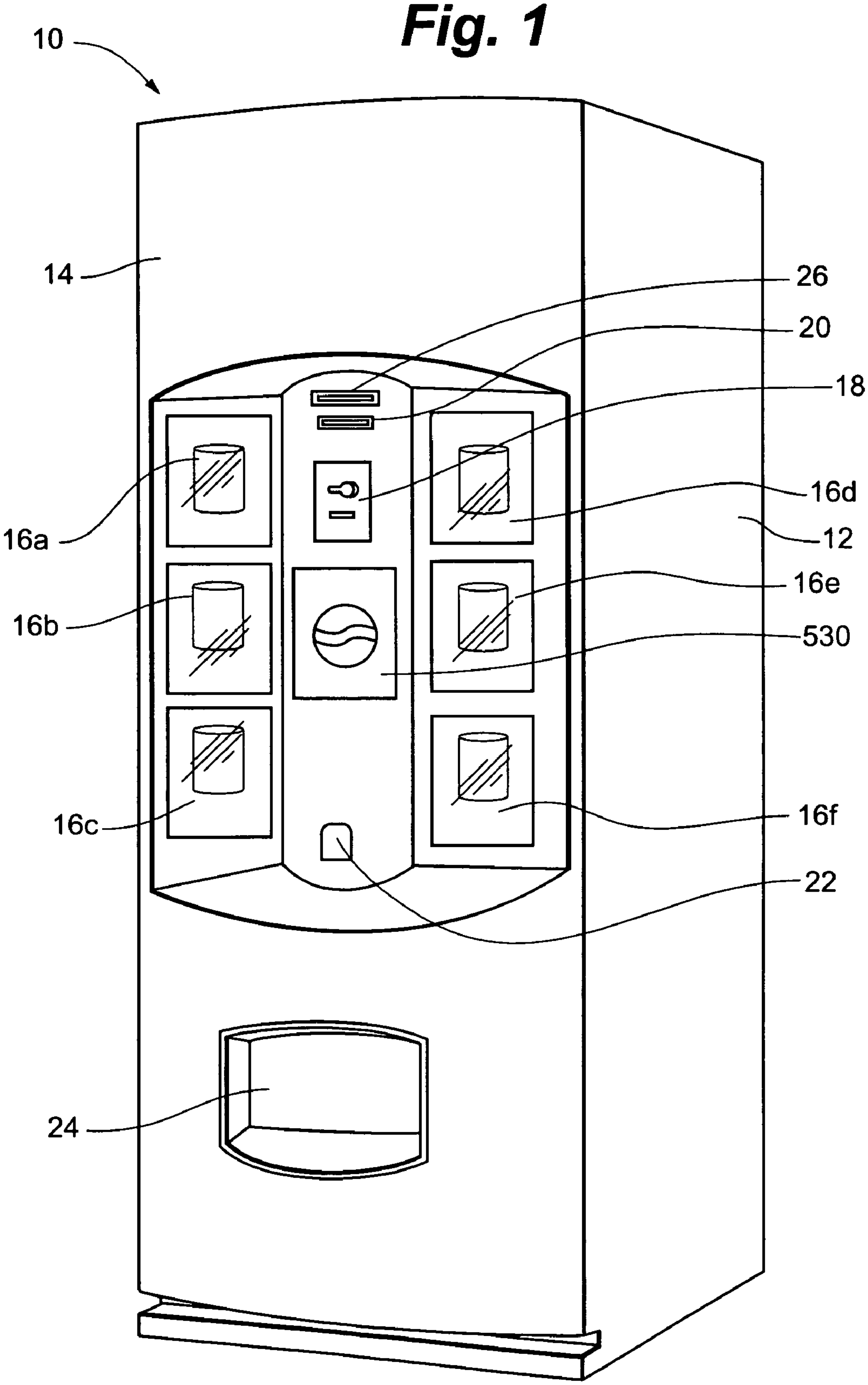
FIG. 1 is a perspective view of an exemplary vending machine of the invention.
Figure 2:
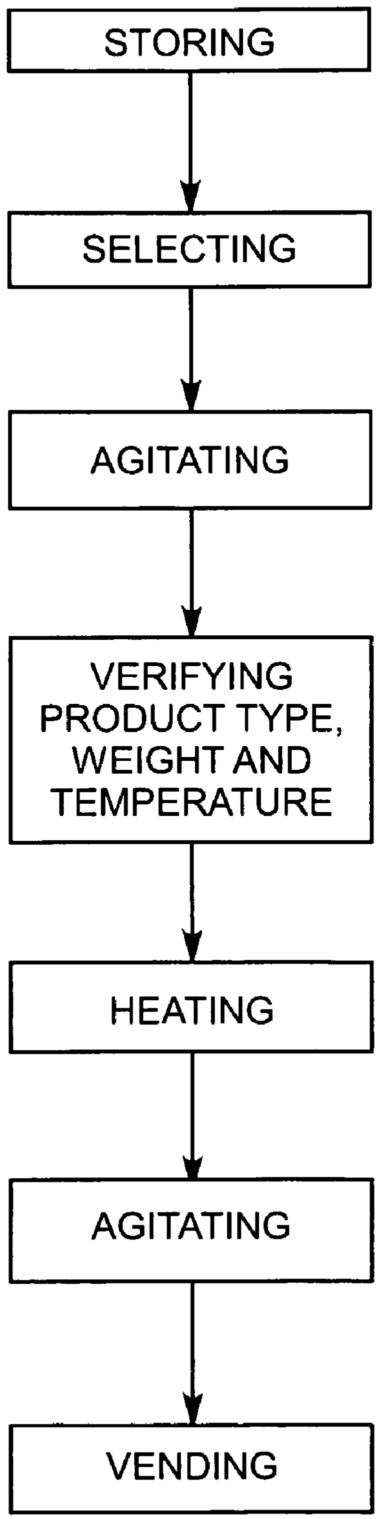
FIG. 2 is a flowchart of the overall operation of the vending machine of FIG. 1.

Referring to the figures generally, and in particular to FIG. 1, there is illustrated a vending machine 10 in accordance with the invention. It should be understood that the depicted vending machine 10 is merely exemplary of the numerous types of vending machines, vending systems, vending kiosks, dispensing systems and other devices and systems for vending or dispensing a food product. Vending machine 10 has a housing 12 with a front side 14. As is typical for vending machines, front 14 has product selection panels, or buttons, 16*a-f* for selecting various products to be vended. Also appearing on front side 14 are customary money payment slots for payment by coins at slot 18, or by bills at slot 20. A coin or change return opening 22 also appears on front 14. Vending machine 10 may also have slot 26 for payment by credit, debit, prepaid or campus-type cards. After payment of the appropriate amount, the customer presses button 16 to select a product, which after heating is dispensed to the customer at outlet 24. Alternately, vending machine 10 may be configured to receive cards of customers that include stored information about the customer's personal preferences and, upon reading the card, automatically dispense the customer's preferred food product. Front panel 14 and buttons 16 are preferably backlighted as known in the vending machine art. Advertisements, displays, product information or any consumer interest media or entertainment may be provided at display 530 for the consumer to read or view while waiting for the selected food product to be heated and dispensed.

Figure 5:
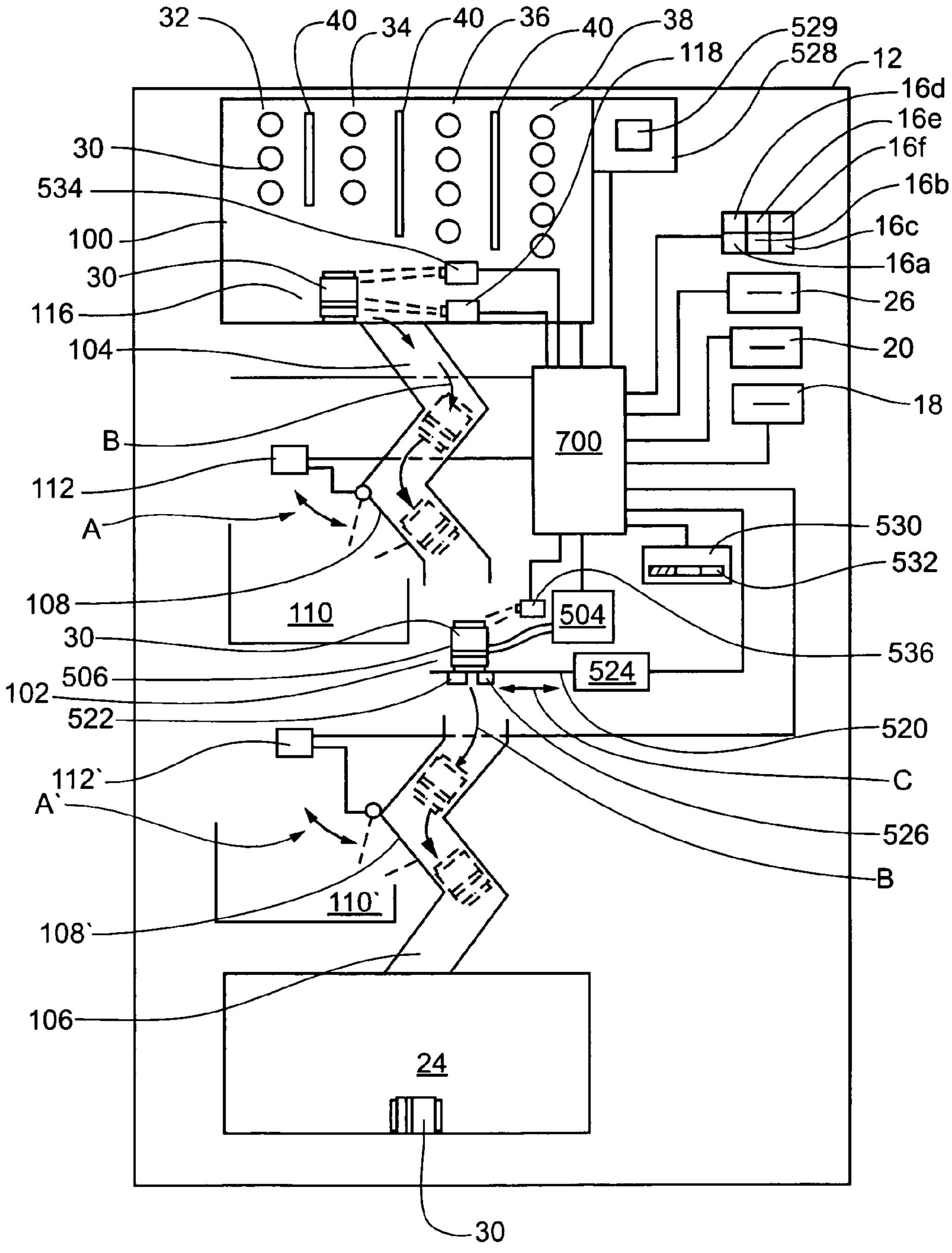
FIG. 5 is a schematic drawing showing the major components of the vending machine of FIG. 1.

Referring to FIG. 5, the various operational components of vending machine 10 are schematically shown. Housing 12 includes a container storage compartment 100, an indicia reading station 116, a container heating station 102 and a container pathway 104 between storage compartment 100 and heating station 102. After transport to heating station 102, as explained later in greater detail, the container is heated to a predetermined temperature. Thereafter the container is transported through passageway 106 to outlet 24 for dispensing to the customer. As used herein, the terms "container" or "containers" broadly include any known container or storage device that contains any food. A controller 700 controls the operation of the system's components. A power supply (not shown) provides electrical power to operate controller 700 and other electrical components.

Pathways 104 and 106 are configured to agitate, displace, shake or vibrate the container as the container moves therethrough to provide mixing of the container contents. Pathway 104 has a trap door 108 disposed therein for diverting a rejected container, that has not met certain requirements, into a waste bin 110 so that the rejected container does not reach dispensing outlet 24. The trap door 108 is normally in the closed position until a sensor of vending machine 10 indicates it is necessary to reject a container because of a failure to meet one or more specifications. Optionally, pathway 106 may also be equipped with a waste bin 110' and trap door 108' that operates in a similar manner to trap door 108.

Storage and Selection of Containers

Housing 12 may be equipped with a temperature management system, for example, cooling system 528, to maintain a desired temperature for the containers stored within storage compartment 100. If used, the cooling system 528 typically includes a compressor 529, an evaporator, a circulating fan, a thermostat and controls. The cooling system 528 is set to maintain storage compartment 100 at a desired temperature, which may be a typical room temperature of about 75° F. or less as desired in order to avoid degradation of the container contents. Also, by standardizing the temperature of the containers while in storage compartment 100, a more predictable heating cycle will be obtained when later heating a container at heating station 102. Depending on the ambient conditions where the vending machine is to be located, housing 12 may also be equipped with a heating system (not shown) to keep storage compartment 100 at a desired temperature. Both cooling and heating for storage compartment 100 may alternately be provided by a heat pump.

The containers may be stored in compartment 100 in any of the arrangements that are known in the art and are utilized in typical vending machines. For example, they may be stacked in vertical columns of containers arranged by product type and brands. When a particular type of product is selected, the lowest container in the column is released to fall towards indicia reading station 116, which includes an indicia reader 118.

The containers may also be stored in a system that uses a plurality of connected inclined ramps that orient the containers in a horizontal position, and the containers roll on their sides or slide to move through the ramps. Upon purchase, a vending mechanism releases the lowest container in the ramp system in response to a signal by the vending mechanism. The upstream containers each advance one position and hold this position until the next vending signal is received.

Vending machine 10 may alternatively store containers in compartment 100 having a glass front where the various products are viewed by the customer, with the containers arranged in columns and rows. The customer indicates a selection by entering a code, such as B4, indicating a selection of the container in row B and column 4. The selected container is then dispensed by any suitable mechanism, which could be a rotating auger that causes the selected container to be released and to fall toward an indicia reading station 116.

Storage compartment 100 may also store the containers in an upright position with the vending signal activating a suitable pickup and dispensing system, which could be vacuum operated. The system may include an arm with an attached vacuum mechanism that is caused to move adjacent the selected container. A vacuum is created of sufficient force to pick up the container. Thereafter the mechanism moves the container in operational relationship with indicia reader 118 where it is released. If desired, containers may also be stored upright in rows along a horizontal or an inclined shelf and be urged by a spring-biased push rod arrangement to cause the foremost container of the row to fall off the shelf to move toward indicia reader station 116.

In another embodiment, vending machine 10 may use a robotic arm to pick up and transfer the selected container to an operative relationship with indicia reader 118. Thus, any storage arrangement and transfer system known in the vending machine art may be advantageously employed to store the containers and transfer them into an operational relationship with indicia reader 118.

As depicted in FIG. 5, containers 30, which in this exemplary embodiment are electrically conductive metal cans, are shown arranged in vertical stacks or areas 32, 34, 36 and 38, segregated by walls 40. Each stack has only one type of product stocked therein. For example, stack 32 may have only containers or cans 30 of vanilla latte, stack 34 may be cans of mocha latte, stack 36 may be cans of cappuccino and stack 38 may be comprised of cans of hot chocolate, for example. Additional stacks or areas may be provided for additional types of foods, as desired.

Prior to sending a selected container to heating station 102, a quality control function is performed at indicia reading station 116, where indicia indicative of the type of product contained in container 30 is read. The purpose of indicia reading station 116 is to ensure that a container 30 transported to this station is actually the type of product intended to be purchased by the customer, i.e., that it is mocha latte, as selected by the customer, and not, for example, hot chocolate. An incorrect product selection might occur if the mocha latte stack 34 were accidentally stocked with one or more hot chocolate containers. Indicia reading station 116 optionally may be positioned in other locations within vending machine 10, e.g., at heating station 102, and may perform its container-type verification function at any other time as long as it is prior to heating at heating station 102. Also, a second indicia reading device may be positioned at heating station 102, or other locations, to again verify that a proper product type is being advanced toward dispensing outlet 24.

Indicia reading station 116 is not only intended to prevent a stocking error from resulting in the customer receiving the wrong product, but also to ensure correct heating of container 30 at heating station 102. Different products have different thermal properties, i.e., different abilities to absorb thermal energy at specific rates, which is defined as a product's specific heat. Products may be generally characterized as those which have approximately the specific heat of water (1.0), such as coffee, and those that have a different specific heat than water. For instance, since hot chocolate has a lower heat transfer coefficient than that of coffee, if a container containing hot chocolate is heated at heating station 102 with the same level of energy and for the same amount of time that is suitable for coffee, the container may become overheated. The overheating may potentially cause the container to develop a leak at its seams, a bulge or cause it to burst or fail in some other manner. Even if the container does not fail, an overheated container can cause discomfort or injuries to the customer. The purpose of indicia reading station 116 is to sense whether a stocking error has occurred, and if so, initiate corrective measures.

Figure 6:
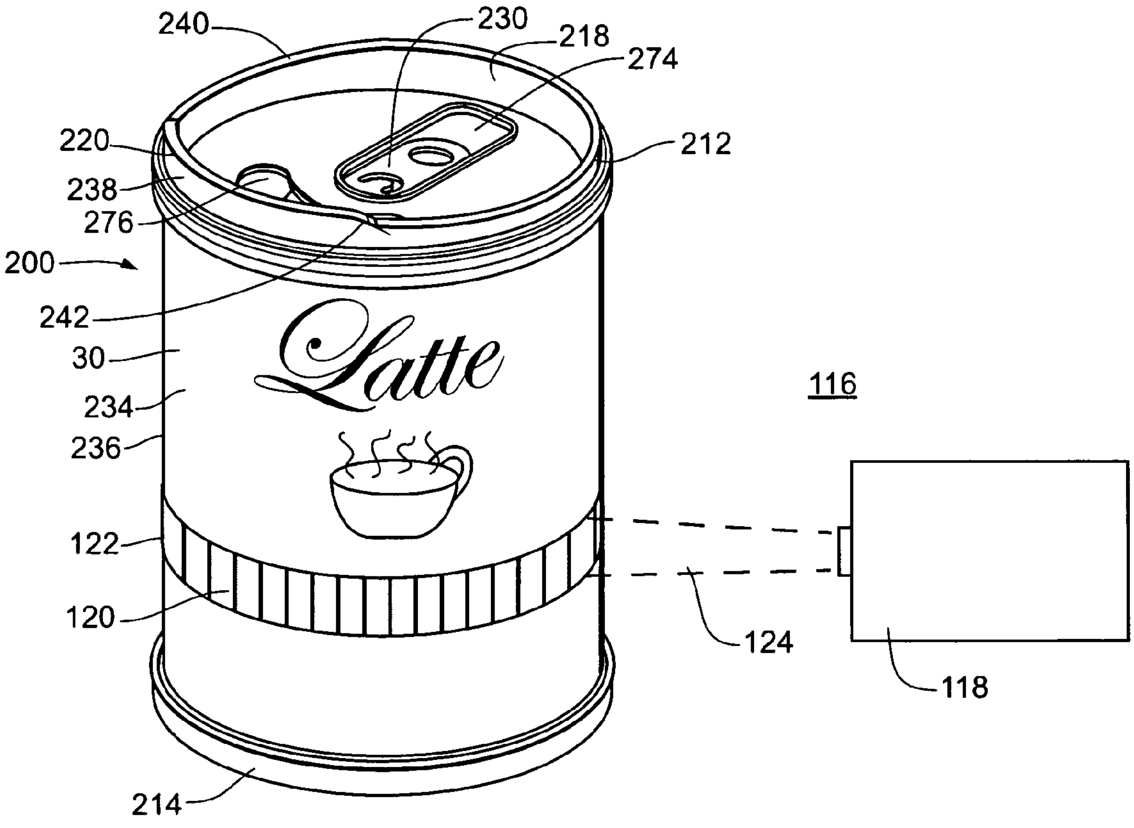
FIG. 6 is a perspective view of a food container with indicia and the indicia scanner of the invention.

The operation of indicia reading station 116 is best seen in FIG. 6. After the customer makes a product selection, a container 30 from the bottom of the appropriate stack, such as stack 34 for mocha latte, is brought to indicia reading station 116 and into position adjacent an indicia reader device 118. The indicia that can be read or detected by a reader of any detection device. In an exemplary embodiment, appearing on container 30 is machine readable indicia 120 within a band area 122 extending around the circumference of container 30. Each product type has its own unique identification indicia located on band area 122. The indicia is machine-readable but does not have to be human readable. Indicia reader 118 is positioned in operational relationship with band area 122 so that an optical signal 124 emitted from indicia reader 118 may be reflected off of indicia 120 and back to indicia reader 118 for reading and analysis by indicia reader 118. In another embodiment, the machine readable indicia may be composed of a label of a different color and thus may extend over an area greater than band area 122, and indicia reader 118 may detect the color to identify the product type. This color code may appear in the region of band area 122 or on the background of the entire label.

If indicia reader device 118 senses that the container it has read does not correspond to the desired food type, steps are automatically taken to divert that container, which is now a rejected container, from proceeding to heating station 102, and to call for the delivery of a replacement container for the desired food type from one of stacks 32, 34, 36 or 38.

To divert rejected container 30, any suitable structure or arrangement may be utilized. In this case, the normally closed trap door 108 is swung to the open position as shown in dotted lines. Next, container 30 is urged into pathway 104 by any suitable known technique in the prior art, including such as by activation of a push rod (not shown) contacting container 30 to urge it to a position where it falls into passageway 104; or by having container 30 positioned on a trap door (not shown) at station 116 and opening the trap door to cause container 30 to drop into passageway 104. With trap door 108 of passageway 104 in the open position, container 30 is diverted into waste bin 110. Any containers so diverted into waste bin 110 may be later retrieved by a stock person and restocked in the appropriate stack 32-38 of storage compartment 100. If a container has been rejected by indicia reader device 118, controller 700 sends a signal to cause delivery of a replacement container to indicia reading station 116. Indicia 120 is read for the replacement container to again determine whether the replacement container is of the correct type of product.

Conveying Container to Heater

If the indicia reader 118 confirms that the selected container is the appropriate product type, i.e., the product type selected by the customer, container 30 is approved to proceed to heating station 102. With the trap door 108 in its normally closed position, container 30 is urged into passageway 104 by structure such as that described previously. As shown in FIG. 5, passageway 104 may have a zigzag configuration that acts to agitate, displace, vibrate or shake container 30 and its contents as it proceeds toward heating station 102. Other suitable configurations for pathway 104 may include a serpentine path through which the container rolls horizontally therealong, a passageway having a path that causes a container to tumble end-over-end, or other pathways known in the art that may be advantageously employed to agitate container 30 and its contents as it travels to heating station 102. Pathway 104 may also include a combination of pathway types that together increase agitation, displacement, vibration or shaking of containers 30 moving through such passageway. Depending on the configuration of pathway 104 and heating station 102, a precision movement device (not shown) may be employed to position a container in heating station 102. The precision movement device may be an x-y or an x-y-z conveying system using stepper motor drives or another known device.

Heating

Heating station 102 may utilize any type of known heating apparatus suitable for the products being vended, such as a resistive electric heating element or a microwave oven. In an exemplary embodiment, the heating device is an inductive heating device. An inductive heating device provides faster heating of the product than a resistive device, thus reducing customer waiting time. Unlike a microwave oven, it may be used for metal containers such as cans. Further, the inductive heating device does not require direct contact with the container.

Figure 3:
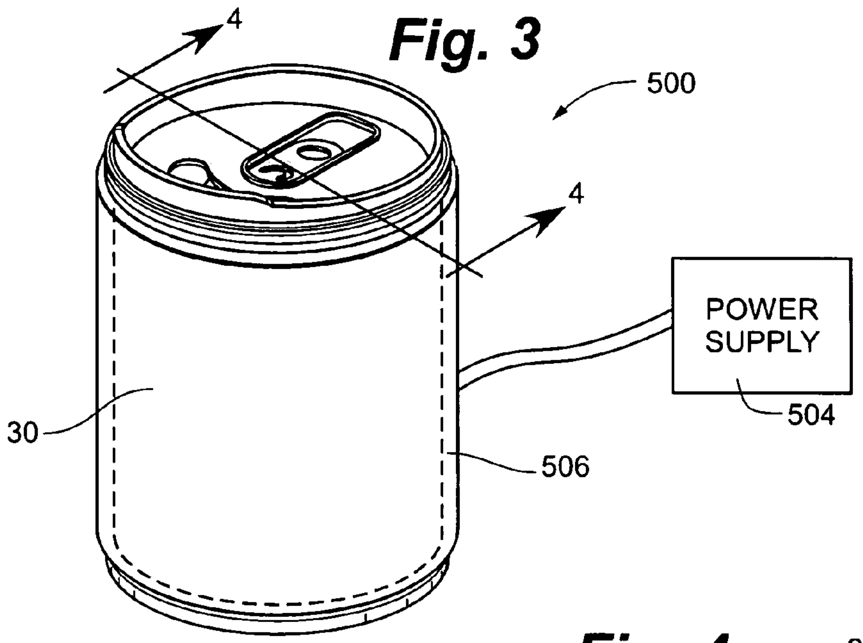
FIG. 3 is a perspective view of the inductive heating device used in the vending machine of FIG. 1.
Figure 4:
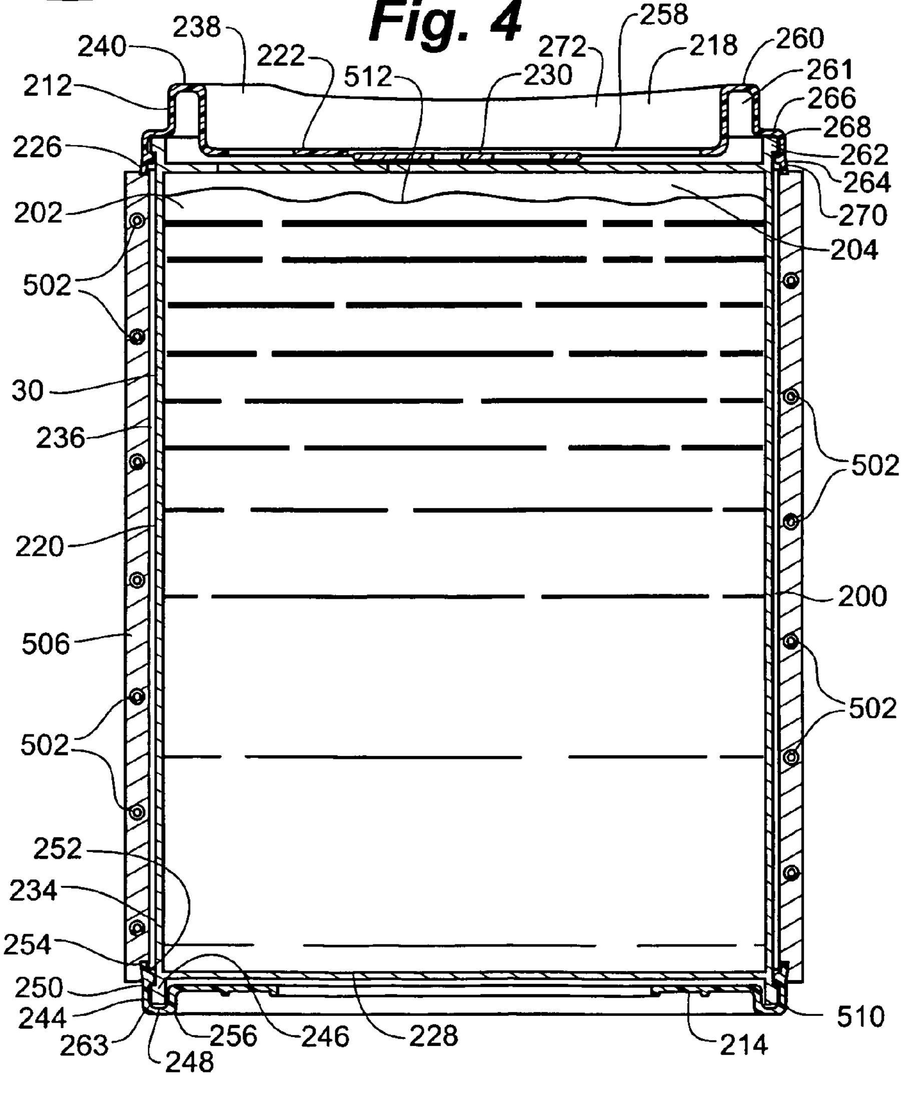
FIG. 4 is a cross-sectional view of the inductive heating device of FIG. 3.

As shown in FIGS. 3 and 4, inductive heating device 500 includes an induction coil 502 and an RF power supply 504. Induction coil 504 is embedded in a sleeve 506 which is cylindrical and has an inner diameter slightly larger than the diameter of the container to be heated. Sleeve 506 has a height approximately equal to the height of the container 30 to be heated. Preferably, however, coil 502 has an overall height slightly less than the height of the container 30 to be heated. It should be understood that sleeve 506 may define other suitable configurations that transfer energy effectively to container 30. Sleeve 506 may be made of any suitable non-conductive, non-ferrous material that will withstand the heating cycle, such as ceramic or epoxy resin. Induction coil 502 may optionally be formed of copper tubing, so that cooling water may be circulated through the tubing to provide temperature control and rapid cool-down of the coil after heating. Alternately, inductive heating device 500 may include two or more independently energizable induction coils, to allow for additional control of the heating process.

When operating, power supply 504 produces a magnetic field around induction coil 502 by sending an AC current through coil 502. The magnetic field induces eddy currents in the container, such as a metal can, generating localized heat to heat the food in the container, without physical contact between induction coil 502 and the container. The container wall is heated, and heat is then conducted to the product inside the container, where convection currents distribute heat within the product. Preferably, the inductive heating device operates on standard 120 VAC so that the vending machine can be connected to a common electrical outlet. Suitable inductive heating systems are commercially available from Ameritherm, Inc, of Scottsville, N.Y.

As shown in FIG. 4, in one embodiment, container 30 to be heated is positioned within sleeve 506 in a vertical, upright orientation, so that induction coil 502 does not extend beyond either the bottom 510 of container 30 or the top level 512 of the product within container 30. This positioning ensures that heat is efficiently transferred to the contents of the container, and avoids transferring excessive heat to either the top and bottom seams of the container, or the gaseous headspace above the level of the food in the can. This is significant because gas will be heated much more rapidly than liquid during induction heating. In this case, the rapid heating of headspace may partially cause the container to bulge or burst, or to expel hot gas and/or liquid when opened by a customer.

As shown schematically in FIG. 5, when container 30 is positioned within sleeve 506, container bottom 510 rests on trap door 520. Trap door 520 can be a laterally movable platform or panel movable towards and away from the bottom of sleeve 506. Although trap door 520 is shown in FIG. 5 as a sliding panel, it may alternately be configured as a hinged swinging door (not shown) or any other suitable configuration as may be known in the art. Trap door 520 preferably includes a load cell 522 for weighing the container to verify that it is properly filled with food. If the container is not filled to the expected level, heating of the larger-than-expected headspace in the container could cause the problems discussed above and the food may also be overheated because of the reduced mass of food in the container. Thus, the container is weighed before the heating device is energized; if the weight of the container is less than a predetermined minimum, the container is rejected before heating. Actuator 524 causes trap door 520 to open, controller 700 signals trap door 108' to open, and the container is expelled to waste bin 110'. This also enhances customer satisfaction by eliminating the possibility of vending a partially-filled container.

Trap door 520 may optionally also include a piezoelectric or other ultrasonic transducer 526 which may be energized to displace, vibrate, shake and agitate the contents of the container during heating. This will ensure both even heating and mixing of the contents to ensure a uniform distribution of the product's components.

When the product has been heated to the desired temperature, trap door 520 is opened, allowing container 30 to fall into pathway 106 and be dispensed to the customer via opening or customer retrieval location 24, which is a bin where the customer can retrieve the ordered product. During travel through pathway 106, heated container 30 is agitated, displaced, vibrated or shaken to mix the contents and distribute heat throughout the product.

Container

Any suitable container can be used in accordance with the invention. For example, if induction heating is employed, the container should be fabricated of electrically conductive material, typically metal such as steel, for example, or at least have an electrically conductive layer preferably in contact with the contents so that heat can readily be transferred from the electrically conductive material, which is heated by induction heating to the product contained therein.

Referring to the FIGS. 4 and 6 generally, and in particular to FIG. 6, there is illustrated a perspective view of a container assembly 200 that is particularly suitable for use with the present invention and can be heated by induction heating and includes top and bottom snap-on caps or covers 212 and 214, respectively. Top cap or cover 212 is generally circular in shape having an inside wall 218 and outside wall 220 having a floor 222 integrally joined to inside wall 218. Indeed, top snap-on cap or cover 212 may comprise one piece of a flexible heat barrier material.

Any suitable material, including plastic, that has heat barrier properties may be utilized for the end caps or covers. Temperatures from heating by induction may approach 140° F. or more. By heat barrier it is meant that the heat from the contents contained in container 30 and thereby conducted to a heat conductible material comprising container 30 is substantially blocked so the user does not burn his/her lips upon immediate contact. A user's lips contact top snap-on cap or cover 212 when the user consumes the contents directly from container 30. The heat barrier properties or characteristics of top cap or cover 212 and bottom cap or cover 214 are distinguished from mere heat insulation properties. Heat insulation primarily keeps the contents of a container at a desired temperature, or at least reduces the temperature loss. The heat barrier material is utilized in the top and bottom ends to prevent and/or reduce the risk of potential injury to the user.

In an exemplary embodiment, container 30 is preferably cylindrically shaped. A lid 226 is attached to the top of container 30 to provide an airtight hermetic seal. Container 30 is made from a heat conductible material, preferably ferrous metal so that it is suitable for magnetic induction heating. Bottom 228 is located at the base of container 30. Lid 226 has a pop-top opener 230 which pushes a scored tab through lid 226 thereby opening lid 226 allowing the contents to pass therethrough when poured. Circular wall 234 of container 30 is generally covered with an insulating material 236 to maintain the temperature of the contents inside the container.

Typical insulating materials utilized with the container may be polypropylene, PET and thick paper. Preferably, polypropylene is utilized with the container.

FIG. 4 shows a sectional view of container assembly 200 with liquid contents 202, for example, contained therein. A head space 204 is provided within container 30 about liquid 202. A spout 238 is shown formed from top edge 240 which is where inside wall 218 and outside wail 220 meet. Spout 238 is shown with tapering sides 242 (shown in FIG. 6). Spout 238 facilitates drinking directly from the container and also facilitates pouring of the liquid contents from the container.

Container wall 234 is shown joining bottom cap 214 with flared portion 244 on annular can rim 246. Flared portion 244 is inside annular groove 248 formed in bottom 228. A flange 250 is formed on inside wall 252 of bottom 228 of container 30 extending radially inwardly above flared portion 244 engaging rim 246. Outside wall 254 of bottom 228 joins inside wall 252 at edge 256 which has a flat surface for supporting the container.

Container 30 has top snap-on cap or cover 212. Inside wall 218 is integrally formed with floor 222 of top snap-on cap or cover 212. Inside wall 218 and outside wall 220 join at edge 240 forming spout 238 adjacent opening 258 in floor 222. Opposite spout 238 on annular edge 240 is ridge 260 which is raised from floor 222 to a height generally below the height of spout 238. Flare 262 of annular can rim 264 is inside annular groove 266 formed on the inside 221 of outside wall 220. Outside wall 220 forms a shoulder 268 on flare 262. A flange 270 extends radially inwardly below flare 262 to engage and grip annular can rim 264. This arrangement ensures top snap-on cap or cover 212 will provide a removable snap-on fit on rim 264 of container 30. Top snap-on cap or cover 212 can also be moved by rotating the cover so that it can be appropriately placed over the pop-top 230 and opening (not shown) in floor 222. An insulating airspace 261 is provided below ridge 260 and the top of lid 226 which further prevents top snap-on cap or cover 212 from becoming heated from container 30 and its contents, thereby providing a further heat barrier. Insulating airspace is defined by the spacing of inside wall 218 and outside wall 220 which is bridged by top edge 240. In this manner, an annular insulating airspace is provided between top edge 240 and lid 226, which can provide a substantial insulating barrier. A similar arrangement could be provided for bottom snap-on cap or cover 214, if desired. As illustrated in FIG. 4, there is only a very small airspace 263. A larger airspace could be provided by extending downwardly inside wall 252 and outside wall 254. Snap-on cap or cover 212 can be readily removed from container 30 by slightly bending cap or cover 212 in a peripheral region thereof and pulling it away from lid 226 of container 30.

Controller/Sensors/Power Management/Display

Any suitable control system can be used in accordance with the present invention.

Referring to FIG. 5, the operation of vending machine 10 is controlled by controller 700, which is preferably a microprocessor-based control system. Any suitable microprocessor with related memory and input/output devices may be utilized. Controller 700 receives inputs from the various user input devices and sensors, and outputs signals to control the product selection, heating and delivery functions. Controller 700 also operates a power management function and the user displays. Because it is microprocessor-based, it is fully programmable to provide flexibility and ease of updating for new products and features. For example, different foods may require different heating profiles (time and power), which may readily be programmed.

In operation, controller 700 receives a signal from coin slot 18, bill acceptor 20 or credit/debit/prepaid/campus card reader 26 and a signal from a button 16 indicating that a customer has selected a product. After confirming that proper payment has been made for the selected product, and dispensing any required change via change return opening 22, controller 700 activates the product selection device to pick the desired product from the appropriate storage compartment and transport it to heating station 102.

Controller 700 receives a signal from indicia reading station 116 and confirms that the selected container matches the selection made by the customer. If it does not, the container is rejected. Controller 700 sends a signal to actuator 112 which opens trap door 108, to divert the rejected container to waste bin 110. If the container matches the customer's selection, trap door 108 remains closed and container 30 descends through pathway 104 to heating station 102. Controller 700 selects the appropriate heating profile for the type of product selected. The indicia scan must be performed prior to induction heating to ensure that the proper heat profile is applied for the selected product type.

Controller 700 then receives input signals from weight sensor (load cell) 522. If the weight does not exceed a predetermined minimum, indicating that the container is not properly filled, the container is rejected by sending a signal to actuator 524 to open trap door 520 and sending a signal to actuator 112' to open trap door 108', diverting container 30 to waste bin 110'. Heating an under-filled container may cause bursting and other problems as previously discussed due to rapid heating of the air in the headspace above the product level.

Controller 700 also receives an input signal from a temperature sensor 534 that detects the temperature of the container prior to heating. The sensor may be any known type of temperature sensor, such as a thermocouple. Preferably, the temperature sensor is an infrared (IR) sensor since, unlike a thermocouple, an IR sensor does not require direct contact with the container. Sensor 534 should be positioned so that it is aimed at an exposed metal portion of container 30, e.g., the top. If the temperature exceeds a predetermined level, the heat profile will be adjusted to heat the container for a shorter period of time. Alternately, if the temperature exceeds a second, higher predetermined level, indicating possible spoilage, the container may be rejected and diverted to a waste bin as previously described.

If a container is rejected as being the wrong type of product, under-filled, or overheated or, if desired, an overfilled condition could also be sensed, controller 700 signals the selection mechanism to select a replacement container of the correct type from the appropriate storage compartment 100.

Figure 8:
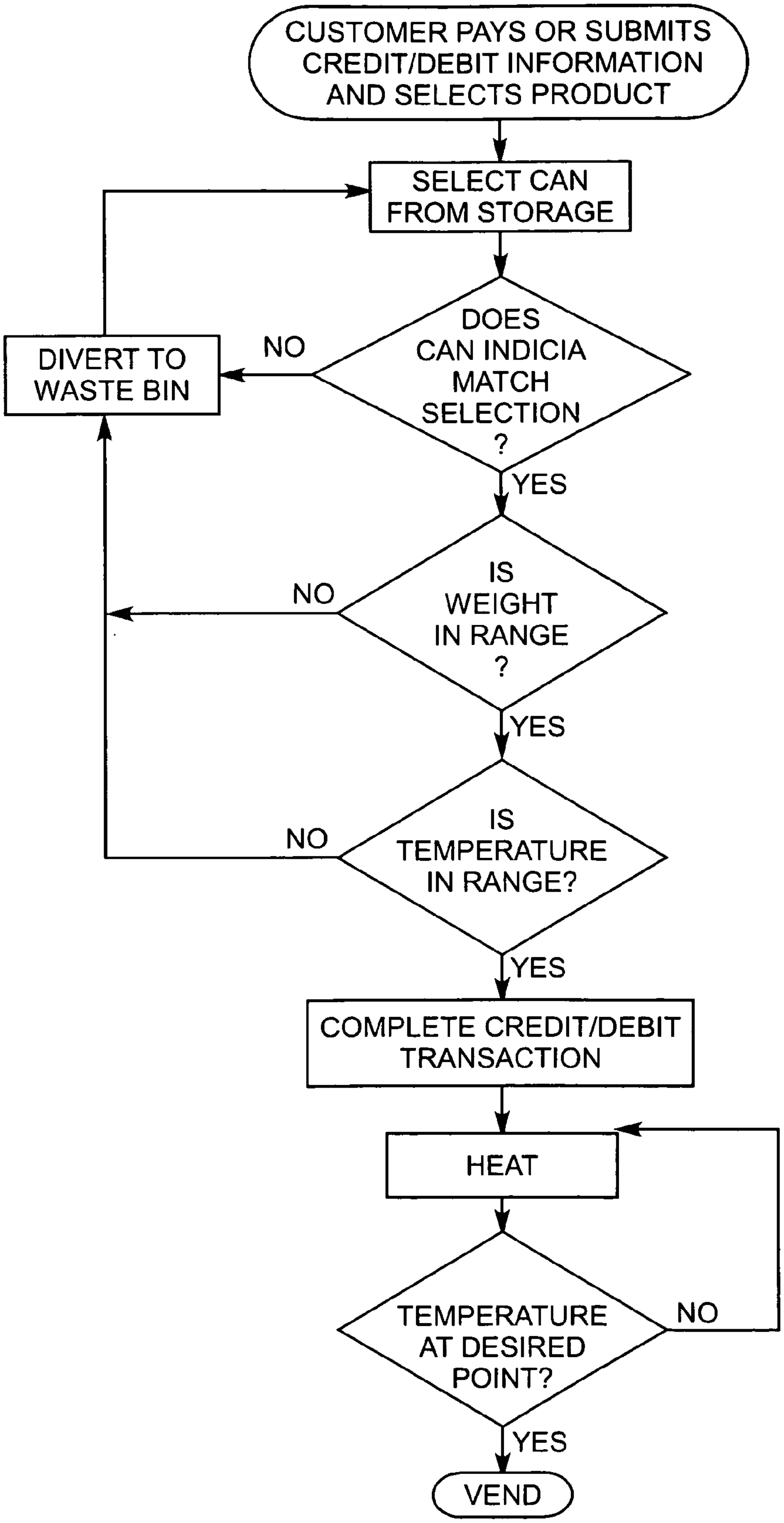
FIG. 8 is a flowchart of the indicia, weight and temperature sensing functions of the vending machine of FIG. 1.

As shown in the flowchart of FIG. 8, the indicia, weight and temperature scans, and selection of a replacement container, if necessary, are, in one embodiment, performed before the customer's credit, debit, prepaid or campus card is charged, so that if the customer's selected product is not available, the customer will not be charged. In the case of a coin or bill transaction, cash can be refunded to the customer if the selected product is unavailable.

Figure 7:
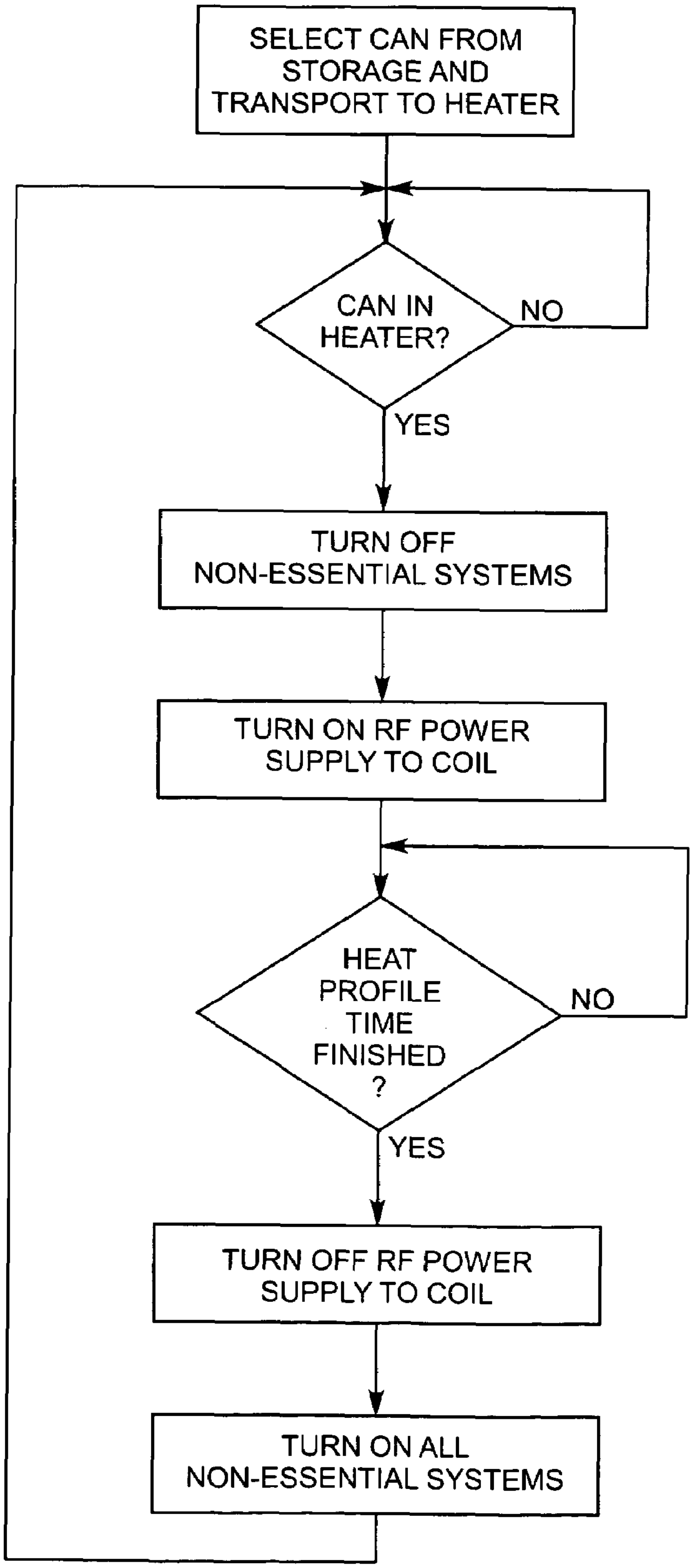
FIG. 7 is a flowchart for a power management feature of the vending machine of FIG. 1.

As shown in the flowchart of FIG. 7, once controller 700 has verified that the proper product has been selected and that the container is properly filled, controller 700 turns off (or inhibits the start of) all non-essential functions of vending machine 10, for example, the compressor 529 in the refrigeration system 528 (and/or the heater or heat pump for storage compartment 100, if applicable), and then turns on the RF power supply 504 to energize induction coil 502. This sequence is desirable because the combined power requirements of induction heating system 500 and compressor 529 may exceed the limits for the electrical circuit to which vending machine 10 is connected. For example, induction heating system 500 requires approximately 1300 watts at full power to deliver about 1100 watts to the container, and a typical 120 VAC/15 A circuit can safely handle approximately 1500 watts. Exceeding this limit would trip a circuit breaker or blow a fuse. Since compressor 529 requires substantial current and power, especially at start-up, compressor 529 should preferably be disabled while inductive heating device 500 is energized to avoid an overload. Preferably, essential functions such as controller 700, lighting, payment acceptors 18, 20 and 26 and display 530 remain energized, since these do not require much power and are necessary at all times. Alternately, controller 700 can continuously monitor the power being used by vending machine 10 through use of a current sensor (not shown), and shut off non-essential components if the current draw exceeds a predetermined limit.

The appropriate level of power is applied to coil 502 for a predetermined time, based on the heat profile for the selected product. For example, for a coffee beverage, the heat profile will indicate heating at full power for about 40 seconds to achieve a desired product temperature of about 140° F. (which has been determined to be the product temperature preferred by most consumers). Full power is approximately 1100 watts for a 9 ounce coffee beverage. However, for hot chocolate, it has been found that heating at a high level for 40 seconds will result in heating beyond a safe limit that may result in degradation of the beverage, damage to the container label, doming or bursting of the container and/or discharge of hot gas or liquid upon opening by the customer. This is due to the fact that hot chocolate has a relatively low heat transfer coefficient, as compared to coffee beverages. Therefore, upon detection that a hot chocolate beverage has been selected, a variable power heat profile is applied in which full power is applied for less than 40 seconds and lower power is applied until the desired temperature is reached. In one aspect of the invention, the relatively high power level is from about 700 watts to about 1500 watts of heat output from the induction heating device per 9 ounces of beverage by volume. For example, full power may be about 1100 watts and lower power may be a predetermined percentage thereof. This method has been shown to eliminate the problems mentioned above due to rapid heating of hot chocolate. In the case of an inductive heating coil, the power applied may be controlled by varying the frequency of the RF alternating current generated in RF power supply 504 and applied to coil 502. The appropriate frequency will depend, in part, on the material of the container (e.g., steel or aluminum) as is known in the art.

Once the appropriate time has elapsed, controller 700 turns off RF power supply 504, thus de-energizing coil 502. A temperature sensor 536 may be provided at heating station 102. Controller 700 receives an input signal from temperature sensor 536 that detects the temperature of the container during heating. Again, the temperature sensor 536 may be an infrared (IR) sensor, and should be positioned to measure the temperature of an exposed metal portion of container 30. If the temperature exceeds the desired final temperature, controller 700 will turn off RF power supply 504 before the full scheduled heating time has elapsed to prevent overheating. If on the other hand the container has not reached the desired vending temperature of 140° F., RF power supply 504 may be turned back on for a sufficient time to bring the container to the desired temperature. Once the desired temperature is reached, the RF power supply is turned off, and the non-essential systems such as the compressor 529 can be turned back on. Temperature sensor 536 is optional, since if the temperature of container 30 prior to heating is known based on a measurement from temperature sensor 534, proper heating of container 30 can be performed simply by selecting the correct heating profile.

During heating of a container, optional piezoelectric or ultrasonic transducer 526 may be activated by controller 700 to vibrate, agitate, shake or displace the container and mix its contents, to provide more uniform heating and mixing of the product. Alternately, other known electronic or mechanical vibration devices may be used.

When the product has achieved the desired temperature, controller 700 signals actuator 524 to open trap door 520, which moves reciprocally in the directions shown by arrow C, allowing the container to fall into pathway 106 and be dispensed to the consumer via opening 24. During travel through pathway 106 in the direction shown by arrows B', container 30 is agitated, vibrated, shaken or displaced in a manner similar as that occurring in passage through pathway 104 as described previously. This agitation serves to again mix the contents of container 30, as well as to more uniformly distribute heat throughout container 30. The heat from any hot spots created during heating is dissipated throughout the container by the agitation of container 30 and its contents while traveling through pathway 106.

Controller 700 also continuously monitors the temperature of storage compartment 100 and controls refrigeration system 528 (and/or a heating system, not shown) to maintain the desired storage temperature for the products.

Vending machine 10 includes a display 530, which serves the dual functions of providing both customer communications (vending information) and entertainment and promotional content to the consumer. Display 530 is operated by controller 700, and may be an LCD or other conventional type of digital display device. When a customer inserts payment, display 530 may indicate product pricing and the amount of money that has been deposited, and then instruct the customer to select a product. For cashless transactions using card reader 26, display 530 may provide appropriate instructions. During the heating and vending process, display 530 provides a status indication, showing for example that the product is being heated. Preferably, display 530 indicates the progress of the process by a bar graph type display 532, showing the percentage of the process that has been completed and/or the percentage that remains. This is desirable because the process of heating and dispensing a hot beverage, for example, takes about 45 seconds, which is considerably longer than the time that a vending machine takes to dispense a cold beverage or snack food item, and customers will appreciate information on the status of their food order.

Because of the time delay between product selection and dispensing due to the time required to heat the product, it is also possible and desirable to use the time to display entertainment content to the consumer. Any type of graphic or video entertainment content may be displayed. In addition, advertising and promotional materials or brand logos can be displayed. Optionally, a speaker (not shown) can be included in front panel 14 so that music or other audio content can accompany the visual display. The bar graph 532 may remain visible during an entertainment or promotional display, or the informational display may alternate periodically with the entertainment/promotional display. When the heating process is completed, display 530 may so indicate and show a message such as "Enjoy your food—Thank you!" or "Caution, the food you are about to enjoy is very hot!" Brand logos or advertising messages may also be displayed when the machine is idle. While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A method of dispensing a food in a vending machine, comprising:
   receiving a selection in a vending machine;
   providing a container of food with the vending machine in response to the selection, the food being of the type that has multiple components and at least one component of the food separates from another food component during storage;
   agitating the container in the vending machine during transport of the container from a storage location in the vending machine to an induction heating device, the agitating including tumbling of the container in a first pathway with a path that zigzags;
   thereafter induction heating the container in the vending machine so as to substantially uniformly heat and disperse the food contained in the container; and
   agitating the container in the vending machine during transport of the container from the induction heating device to an outlet, the agitating including tumbling of the container in a second pathway with a path that zigzags, wherein said agitating before and after the heating uniformly mixes the food in the container.

2. The method of claim 1 further comprising agitating the container during said heating.

3. The method of claim 2 wherein said agitating comprises vibrating the container.

4. The method of claim 3 wherein said vibrating is caused by a piezoelectric crystal transducer.

5. The method of claim 4 wherein said vibrating is caused by an ultrasonic generator.

6. The method of claim 1 wherein said tumbling of the before and after said heating comprises end-over-end tumbling of the container.

7. The method of claim 1 wherein said tumbling in the second pathway comprises end-over-end tumbling of the container.

8. The method of claim 1 wherein said container is generally cylindrical.

9. A vending machine apparatus for agitating a food in a container comprising:
   a vending machine housing;
   a panel for receiving a food selection;
   a storage area in the housing for containing a plurality of containers having food contained therein;
   an induction heating device in the housing configured to heat a container; and
   a container pathway configured to assist in delivering a selected container to the heating device, the container pathway configured to agitate the selected container before delivering the selected container to the induction heating device by causing the selected container to tumble in a path that zigzags as it traverses the container pathway to uniformly mix the food in the selected container.

10. The vending machine apparatus of claim 9 wherein the container pathway is configured to cause the container to tumble end-over-end to provide agitation of the food contained in the container.

11. The vending machine apparatus of claim 9 further comprising a display configured to provide visual information to a customer.

12. The vending machine apparatus of claim 9 further comprising means for accepting a payment card from a customer, the payment card being selected from the group consisting of credit card, debit card, pre-paid card and campus card.

13. A vending machine apparatus for agitating a food contained in a food container comprising:
   a vending machine housing;
   a panel configured to receive a selection corresponding to a container;
   a storage area in the housing for containing a plurality of containers having food contained therein;
   a first pathway comprising a path that zigzags, the first pathway configured to agitate food in a container by tumbling the container to uniformly mix the food in the container as the container traverses the first pathway;
   an induction heating device in the housing configured to heat a selected container, wherein in the first pathway is configured to assist in transporting a container between the storage area and the induction heating device;
   an agitation device configured to agitate the selected container during heating by the induction heating device;
   a second pathway comprising a path that zigzags, the second pathway configured to agitate food in a container by tumbling the container to uniformly mix the food in the container as it traverses the second pathway; and
   an outlet, wherein the second pathway is configured to assist in transporting a container between the heating device and the outlet.

14. The vending machine apparatus of claim 13 wherein the agitation device comprises a piezoelectric transducer configured to act as an ultrasound generator.

15. The vending machine apparatus of claim 9 further comprising an agitation device configured to vibrate a container while it is being heated by the induction heating device, wherein the agitating device comprises an ultrasound generator.

16. The vending machine apparatus of claim 13, wherein one of the first pathway and the second pathway comprises a door, wherein the door is configured to cause the container to be delivered to one of the heating device and the outlet when the door is in a closed position and wherein the door is configured to cause the container to be delivered to a holding bin when the door is in an open position.

* * * * *